United States Patent [19]
Boyd

[11] Patent Number: 5,498,084
[45] Date of Patent: Mar. 12, 1996

[54] AUTOMATIC TRANSMISSION FRONT-BEARING OIL-FLOW CONTROL AND METHOD OF CONTROLLING SAME

[75] Inventor: Richard M. Boyd, St. Louis Park, Minn.

[73] Assignee: Quadion Corporation, Minneapolis, Minn.

[21] Appl. No.: 355,624

[22] Filed: Dec. 14, 1994

[51] Int. Cl.$^6$ ..................................................... F16C 17/12
[52] U.S. Cl. ........................... 384/130; 384/399; 384/477; 29/898.11
[58] Field of Search ................... 384/130, 477, 384/280, 399, 398, 273; 29/898.11

[56] References Cited

U.S. PATENT DOCUMENTS

| | | | |
|---|---|---|---|
| 4,112,574 | 9/1978 | Deli | 29/898.11 |
| 4,268,044 | 5/1981 | Killian | 384/130 |
| 4,949,821 | 8/1990 | Murota et al. | 384/282 |
| 5,419,641 | 5/1995 | Fujinami et al. | 384/470 |

OTHER PUBLICATIONS

Drawing of automatic transmission (no date).

*Primary Examiner*—Lenard A. Footland
*Attorney, Agent, or Firm*—Schroeder & Siegfried

[57] ABSTRACT

Means and method for restricting the flow of oil which passes between the front bearing and the main shaft of an automatic transmission for motorized vehicles. A gland is formed at the downstream end of the front bearing in either the inner surface of that bearing or of the housing into which the bearing is press-fitted. A split ring made of thermoplastic material having a pressure velocity value in excess of 20,000 at 100 feet/minute surface speed is inserted in the gland and keyed in place against rotation. The ring has a diameter which is slightly less than the diameter of the main shaft which it surrounds, and has circumferential gaps between its overlapping end portions which extend circumferentially 0.006"–0.300" and has axial dimensions of 0.006"–0.150". The circumference of the ring is spaced radially from the opposed wall of the gland at least 0.0005".

15 Claims, 5 Drawing Sheets

U.S. Patent   Mar. 12, 1996   Sheet 3 of 5   5,498,084
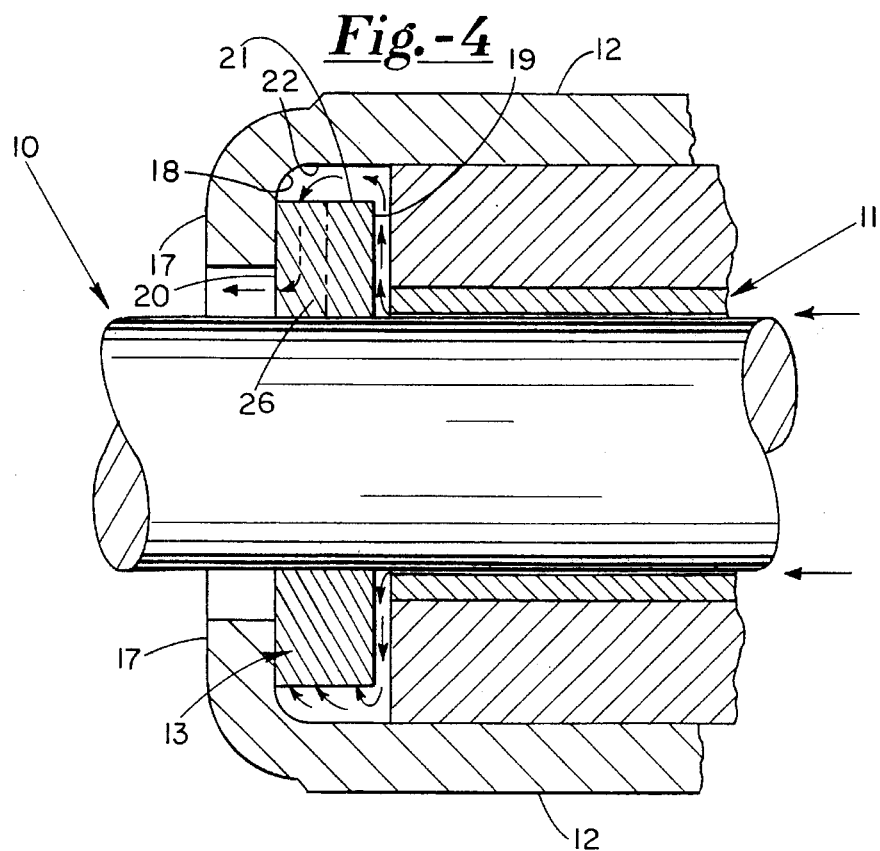
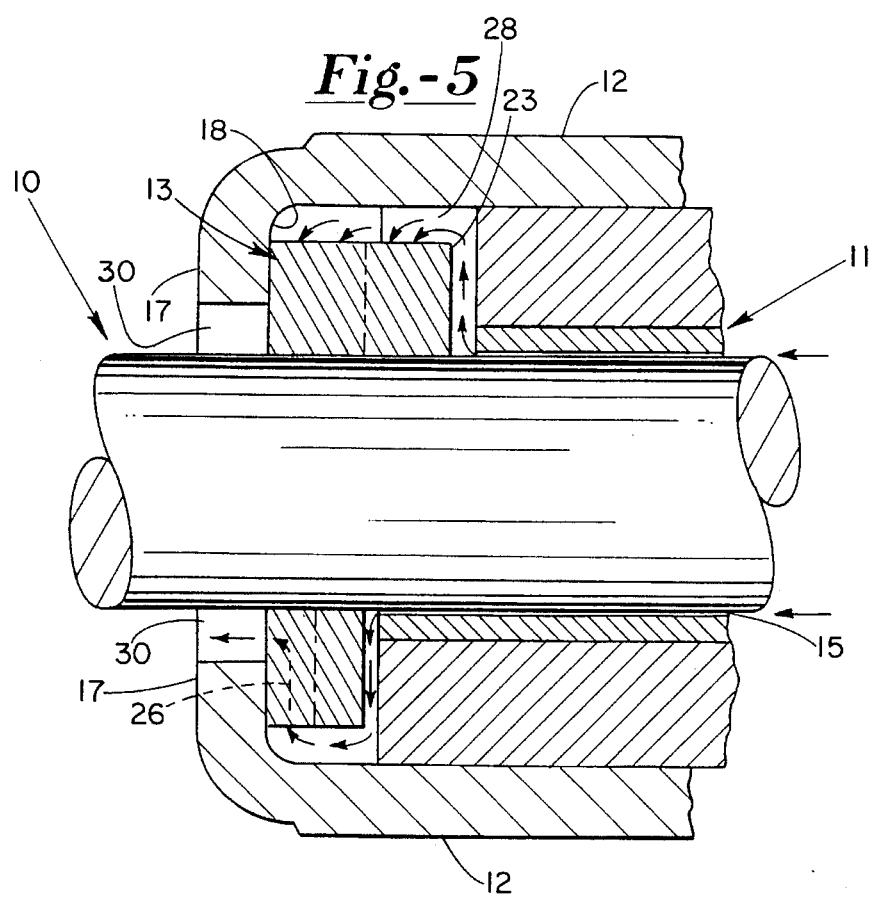

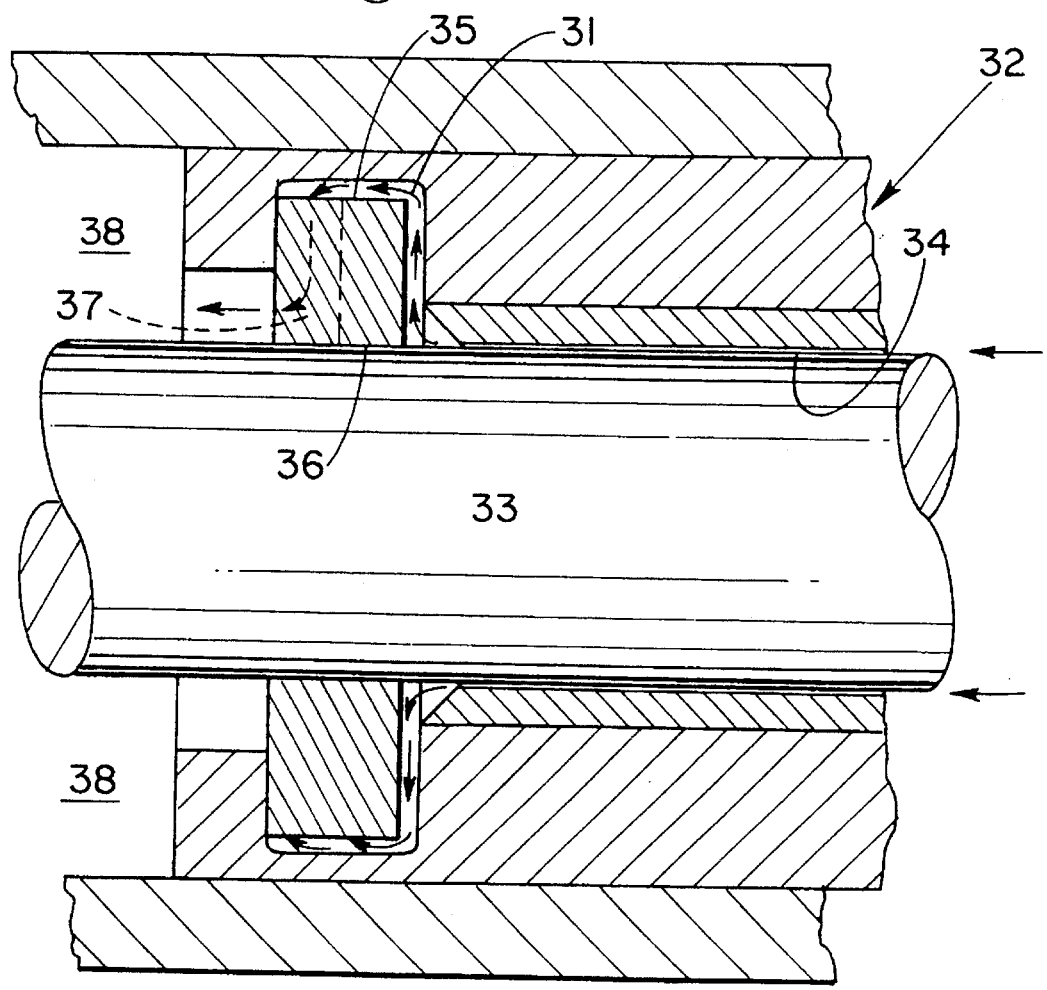

AUTOMATIC TRANSMISSION FRONT-BEARING OIL-FLOW CONTROL AND METHOD OF CONTROLLING SAME

BACKGROUND OF THE INVENTION

Automatic transmissions for motorized vehicles necessarily utilize a continuous interior circulation of oil. As a consequence, the oil is used over and over. Over the years, such automatic transmissions have gradually diminished in size and the oil pumps thereof likewise have become smaller. As a consequence, it is important that the supply of oil which is available therein be utilized efficiently. With the larger pumps, there was a sufficient supply of oil furnished so that parts of the transmission were supplied with more oil than was actually needed. In recent years, however, such excess flow of oil is needed elsewhere within the interior of the transmission.

One such area of the automatic transmission where an excess flow has been provided is that between the tubular front bearing and the main shaft. The main shaft is driven by the torque converter and the front bearing is located at the end of that shaft. The conventional front bearing is installed within a metal sleeve by means of a press-fit and it surrounds the main shaft, to confine a flow of the oil in the space between its interior wall surface and the circumferential surface of the rapidly rotating main shaft. The main shaft rotates at an extremely high rate of speed and, consequently, generates high temperatures over a wide range of approximately −40° F. to 300° F. Such shafts rotate in the neighborhood of up to 7,000 revolutions/minute and have a surface speed of approximately 3,200 feet/minute. The flow of oil therearound can be thought of as an oil-bearing. In the form of transmission shown herein, once the oil flows past the front bearing, it is returned to the pan from which it is recirculated. If the flow becomes inadequate, there is danger of a "lock-up" between the main shaft and the surrounding front bearing, which would destroy the automatic transmission. The exact amount of oil-flow required to maintain the front bearing in "live" condition has not been determined. A "live" condition is defined as conditions under which there is sufficient oil-flow to enable the front bearing and oil to function as a bearing for the main shaft.

Until recently the flow of oil between the front bearing and the main shaft was approximately 2–4 liters/minute. The volume of oil-flow through the front bearing varies with the temperature of the oil because the viscosity of the oil decreases as the temperature rises, which causes the oil-flow rate to rise, everything else being equal. A flow of 2–4 liters/minute exceeds the amount of oil-flow which is required, and the engineers are seeking to restrict the flow and re-direct the excess to other parts of the transmission where it is needed. As a consequence, I was requested to design a method of partially restricting the flow of oil between the main shaft and the front bearing so that the excess could be utilized elsewhere. It was estimated by the engineers that the flow should be reduced to 0.7 liter–1.5 liters/minute.

The engineers informed me that they had unsuccessfully sought to utilize an elastomeric ring to control the oil-flow, but to no avail. A thermoplastic ring maintains a consistent resistance to oil over a broad range of temperatures. An elastomer cannot maintain a consistent modulus over the broad temperature range to which a transmission is subjected. In addition, one cannot achieve a controlled flow with the modular change of the elastomer.

When I proposed the thermoplastic ring which is the subject matter of this application, the engineers laughed at the prospect. We have found, however, that with such a thermoplastic ring when manufactured and installed properly, and with an appropriate gap size, the flow is controllable and will be reduced to the desired levels while still providing a controlled flow which is adequate to maintain the bearing in a condition such that it can perform its intended function.

Similar split rings have been utilized previously in a groove or gland, but only under conditions such as to attempt to maintain a complete seal, so as to prevent any flow of oil thereby. We know of no instance where such a ring has been used to provide a continuous controlled flow, or for any purpose where the ring has been installed under the conditions and in the manner and location which we prescribe herein. These conditions, as will be shown hereinafter, are essential to the proper function of the ring to provide a controlled flow through the bearing and past the main shaft.

BRIEF SUMMARY OF THE INVENTION

The invention consists of a simple and inexpensive device for diminishing to a controlled and determined extent the flow of oil within an automatic transmission, between its main shaft and the front bearing. It is comprised of a split ring slightly smaller in diameter than the main shaft and extending therearound and having overlapping free end portions with a gap therebetween of prescribed dimensions, the ring being made of a thermoplastic material having a pressure velocity value of at least 20,000 at 100 feet/minute surface speed. The material from which this ring is molded is known commercially as PEEK (polyetheretherketone). The free-form diameter of the ring is 0.030" less than the diameter of the main shaft.

The gaps of the ring have circumferential dimensions within the prescribed range of 0.006"–0.300", the preferred range being 0.040"–0.150". The prescribed overall axial dimension of these gaps is 0.006"–0.150", and the preferred range is 0.020"–0.070".

A groove or gland is formed in either the interior surface of either the bearing or the housing, in which the shaft is rotated. In either circumstance, the gland is of sufficient dimension axially of the shaft so that there is oil-flow space between the downstream end of the bearing and the upstream surface of the ring so that the oil-flow can bear against the upstream side of the ring. Also, the ring has a circumferential axially extending surface extending parallel to an opposed interior wall of the gland, the two surfaces being spaced at least 0.0005", in order that the oil may bear against the ring's circumferential surface and apply pressure thereto.

We have been running tests on the above assembly in excess of four (4) months, and they are still performing excellently. The tests show that the flow-control ring described and installed as defined herein dramatically and accurately reduces the flow of oil past the main bearing.

It should be noted that the increased pressure within the oil-flow between the main shaft and front bearing, which is generated therein as a direct result of the restriction in flow, increases the efficiency of the bearing effect of the oil-flow, since a lesser flow under greater pressure may more adequately support a rotating shaft than the same flow under lesser pressure.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which:

FIG. 4 is a further enlarged vertical sectional view of my invention disposed downstream of the end of the bearing, with the locking tab omitted, for clarity;

FIG. 5 is a vertical sectional view of my invention as shown in FIG. 4 but taken through the locking tab thereof;

FIG. 6 is a vertical sectional view of my invention disposed within the front bearing adjacent its downstream end, with the locking tab omitted, for clarity;

DETAILED DESCRIPTION OF THE INVENTION

Figure 1:
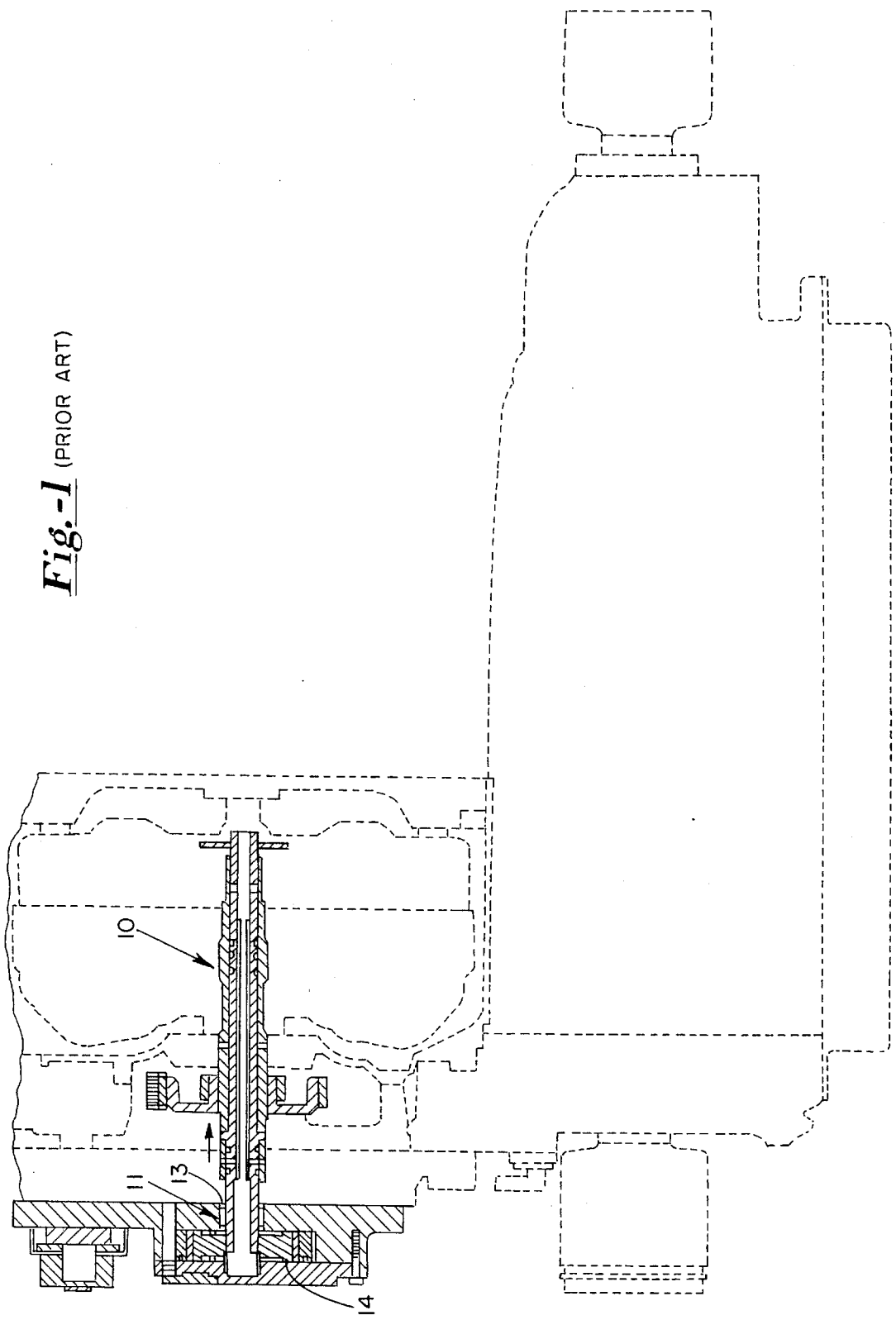
FIG. 1 is a vertical sectional view of a prior art automatic transmission shown largely in phantom, with only the main shaft and front bearing area depicted.

FIG. 1 shows a general view of an automatic transmission of the type commonly in use in the current market. For the sake of brevity, the major portion of the automatic transmission has been shown in phantom, the parts which are critical to the instant invention being shown in section. The comparative portion of another type of automatic transmission, wherein the direction of flow of oil is to the left rather than to the right, is shown in FIGS. 2–6, inclusive.

FIG. 1 shows the main shaft of the automatic transmission, which is identified by the numeral 10. As is conventional in automatic transmissions, there is a front bearing 11 which surrounds the main shaft loosely so as to permit a flow of oil therebetween. The purpose of the oil flow is to preclude the laminated front bearing 11 from locking up with the main shaft because of the high temperatures which are generated by the extremely high speed of rotation of the main shaft. As shown, this front bearing 11 is located adjacent the oil pump 14.

The flow restricting ring, which is the subject of this invention, is introduced immediately downstream of the front bearing 11. This point of location has been identified in FIG. 1 by the numeral 13, although the ring itself cannot be adequately seen. As is conventional, a housing 12 surrounds the front bearing 11, the bearing being press-fit thereinto. This can be best seen in FIGS. 3 and 4. The oil moves from the oil pump 14 through the oil passage 15, which exists between the front bearing 11 and the main shaft 10.

Figure 2:
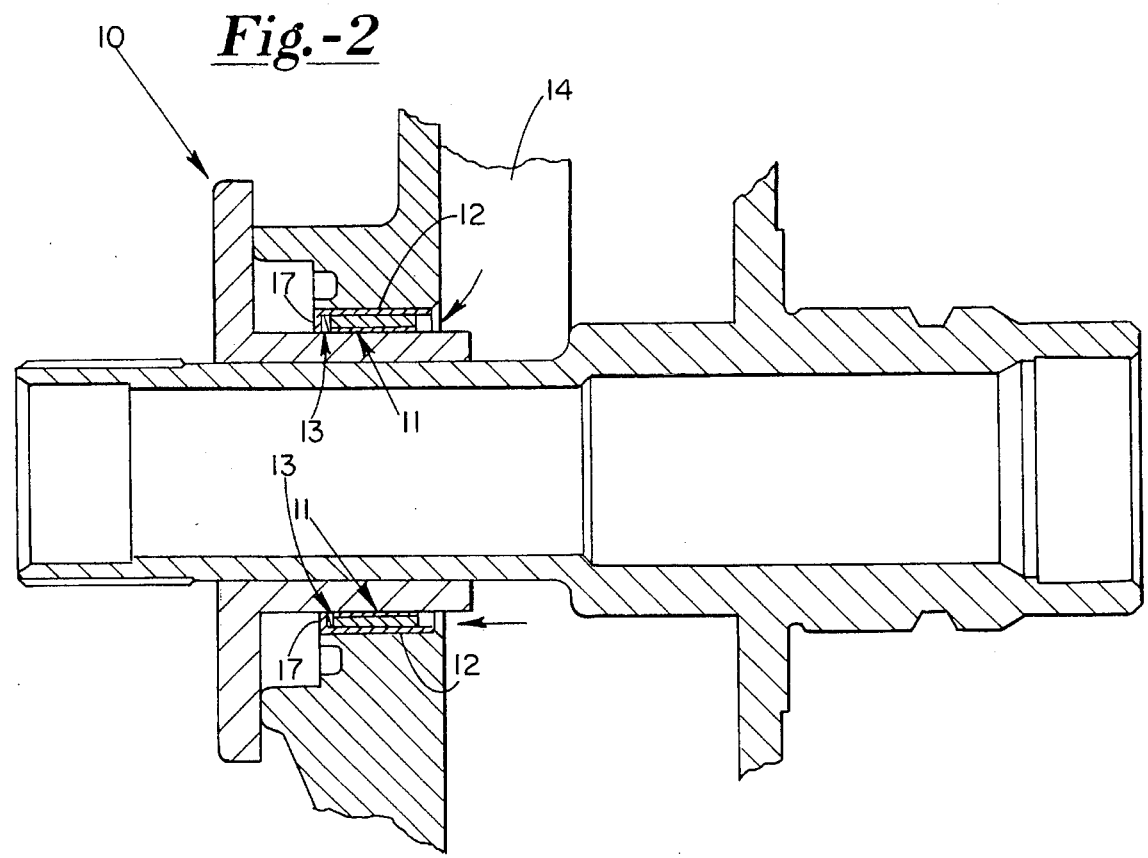
FIG. 2 is a vertical sectional view of the most pertinent portions of another automatic transmission modified to include the invention.

FIG. 2 shows the position of the installed flow restricting ring 13 in greater detail. As shown, the housing 11 has been provided with a radially inwardly extending flange 17 just downstream of the downstream end of the front bearing 11, so as to provide a gland thereat. Without this gland and the flow restricting ring 13 therein, approximately 2–4 liters of oil flows through the passage 15 between the front bearing 11 and the main shaft 10. With the ring 13 disposed within the gland formed by the flange 17, the flow of oil is restricted to 0.7–1.5 liters/minute, thereby maintaining an adequate flow of oil therebetween, but substantially diminishing the flow so that the supply of oil thus conserved can be utilized elsewhere in the automatic transmission.

Figure 3:
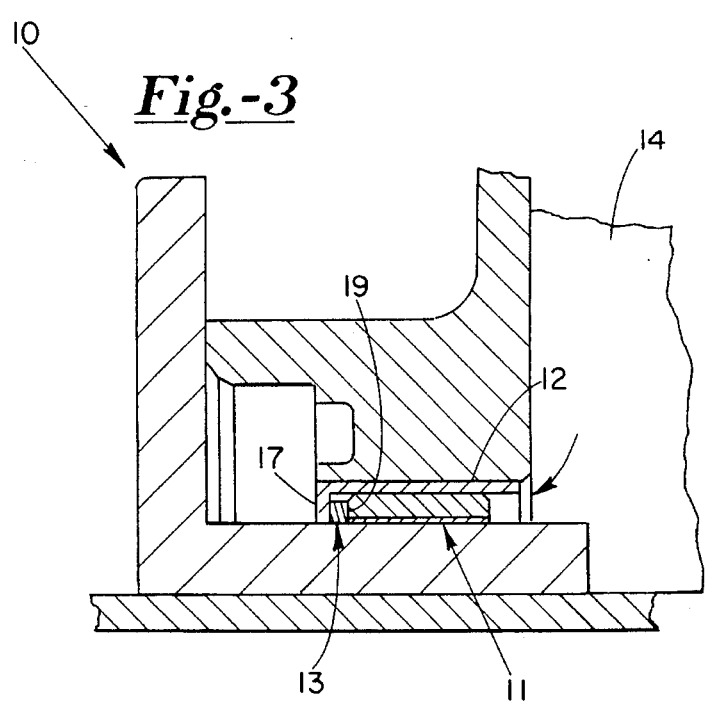
FIG. 3 is an enlarged detailed view of the main shaft and front bearing of FIG. 2 with the controlling ring of the invention shown in more detail.

As shown in FIG. 3, which is the same installation as that shown in FIG. 2, but on a larger scale, the downstream flat side of ring 13 abuts against the upstream facing surface 18 of flange 17. There is a space between the upstream surface 19 of ring 13 and the downstream surface 20 of bearing 11. Thus, there is a passage for the oil which flows between the front bearing 11 and the main shaft 10 beyond the downstream end of the bearing 11 and radially outwardly so as to engage the circumferential surface of the ring 13. This is best shown in FIG. 4. The full impact of the oil-flow through passage 15 reaches upstream surface 19 and follows the arrows radially outwardly between the downstream end of the bearing 11 and ring 13 to the area between the circumferential surface 21 of ring 13 and the housing 12. Housing 12 has an axially extending surface 22 which is radially aligned with the ring 13 and faces the same. It is spaced therefrom at least 0.0005 inches so that the effect of the oil-flow pressing the ring 13 tightly around the main shaft can be accomplished.

Figure 7:
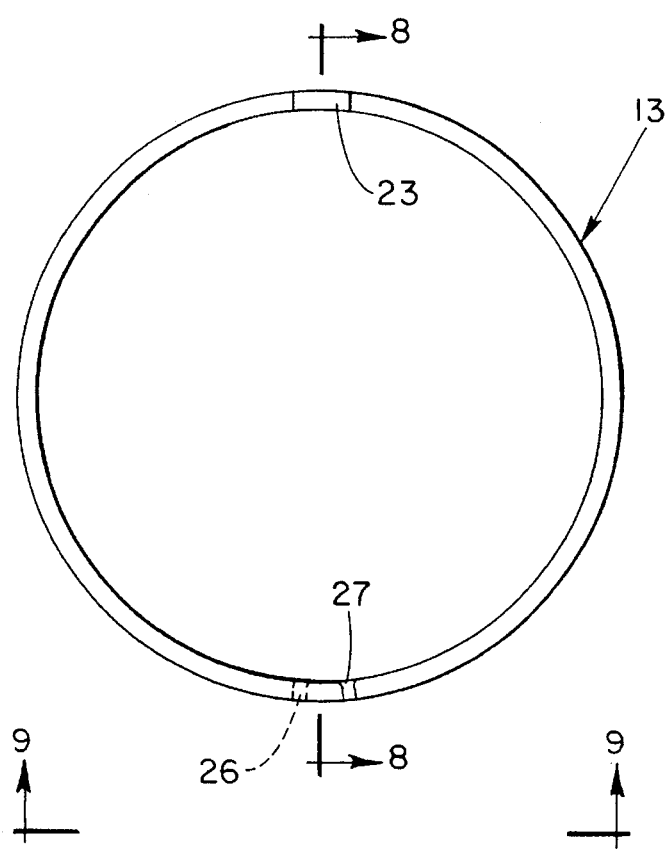
FIG. 7 is a side elevational view of the thermoplastic split-ring, which is part of the invention and is shown apart from the gland.
Figure 8:
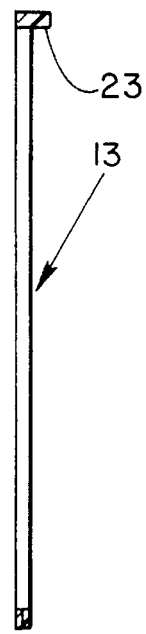
FIG. 8 is a transverse vertical sectional view, taken along line 8—8 of FIG. 7.
Figure 9:
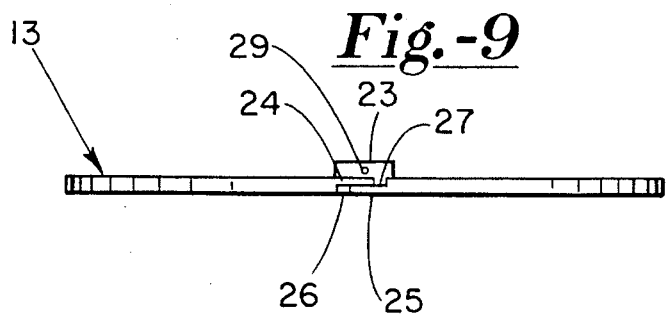
FIG. 9 is a bottom plan view of the overlapping end portions of the split-ring shown in FIG. 7.

FIGS. 7–9 show the details of the thermoplastic ring 13. As shown, ring 13 is rectangular in cross section throughout most of its circumferential length, except for the presence of tab 23. As shown, the ring is split and has overlapping end portions 24, 25 which, when installed, are shifted to form circumferentially spaced gaps 26, 27. Ring 13 has a diameter 0.0300 inches less than the diameter of the main shaft 10 and, when applied to the shaft, overlapping end portions 23 and 24 become spaced circumferentially to provide two circumferentially spaced gaps 26, 27. These gaps extend radially through the ring and are spaced circumferentially the size of the gap which is on the downstream side of the ring to determine the rate of flow of oil which is permitted to pass between the front bearing 11 and the main shaft 10.

The ring 13 is preferably made of a thermoplastic material known as polyetheretherketone. It is commercially identified as PEEK. As previously indicated herein, it has a pressure velocity value of at least 20,000 at a surface speed of 100 feet/minute. It has a temperature range of –40° to 300° F.

The ring shown in FIGS. 7–9 is a ring recently being tested, as described hereinabove, and has an internal diameter within the range of 1.7446–1.7465 inches and has a radial thickness of 0.062–0.065 inches. Its axial thickness is between 0.0551–0.0578 inches. The circumferential dimension of the locking tab 23 is 0.245–2.55 inches. The tab has the same radial thickness as the remainder of the ring 13.

As shown in FIGS. 7–9, ring 13 is rectangular in cross section throughout most of its circumference, except for the presence of locking tab 23. As shown, it is split and has overlapping end portions 24, 25 which, when installed, are shifted to form circumferentially spaced gaps 26, 27.

Locking tab 23 extends axially into recess 28 of bearing 11, which is provided for that purpose. This tab prevents rotation of the ring 13 with the shaft 10. A gate mark 29 is carried by tab 23 opposite the overlapping end portions, for the molten plastic is introduced at the point where the gate is formed. The opposite position of the locking tab facilitates the molding operation since, if the plastic were introduced at the split end portions, molding problems would arise.

The size of the gaps upon installation is the critical feature of the ring and the controlling feature of the invention. The range of their circumferential dimension is 0.006–0.300 inches. The range of their axial dimensions is 0.006–0.150 inches. The preferred range of their circumferential dimension is 0.040–0.150 inches and the preferred range of their axial dimensions is 0.020–0.070 inches.

The circumferential dimensions of the overlapping end portions 24, 25 is 0.250 inches and their axial thickness is 0.023–0.029 inches. The circumferential dimensions of the gaps 24, 25, as installed, is 0.106–0.108 inches. The combined axial thickness of the end portion 24, 25 slightly exceeds the axial dimension of the ring 13 adjacent said end portions.

FIG. 5 illustrates the position of the locking tab 23 within the recess 28 which is formed in the downstream end of front bearing 11. The arrows indicate the path of oil-flow. As shown, the oil flows upwardly into the cavity located between the circumferential surface of ring 13 and the wall 22 of housing 12 and bears radially inwardly against the ring to maintain it in close fitting relation to shaft 10. As shown in the lower portion of FIG. 5, some of that oil passes through gap 26 and is released into passage 30, which leads back to the pan (not shown) of the automatic transmission for recirculation. The remainder of the oil is blocked from similar passage elsewhere by the close fit of the interior diameter of ring 13 around main shaft 10. Escape of oil through gap 27 is precluded by the portion of ring 13 which is axially displaced relative to gap 26 and which carries overlapping portion 24, and is in radial alignment with gap 27.

FIG. 6 shows a gland 31 formed in the downstream end portion of the bearing 32 which surrounds main shaft 33. As shown, the path 34 of oil follows the arrows therebetween and then extends radially outwardly to the limited space between the outer circumference 35 of the thermoplastic ring 36. This ring 36 is made of the same material as that of ring 13 and is identically constructed. Again, a limited amount of oil escapes through the gap 37 into passage 38 which leads to the pan (not shown) of the automatic transmission for recirculation.

From the above it can be seen that the gland may be formed within the downstream end portion of the bearing to provide a flow-restricting assembly which will function equally as well as when formed in the housing. The preferred form, however, is the gland formed within the housing, because of the relative ease with which it may be formed.

As described hereinabove, after the gland has been formed, either in the housing beyond the downstream end of the front bearing or within the downstream terminal portions of the bearing, the ring 13 is inserted therein so as to bear against the surface of the gland which faces upstream. Since the internal diameter of the ring is slightly less than that of the main shaft, the overlapping portions of the ring will thereby become slightly spaced circumferentially and the gaps hereinbefore described are thereby produced. Since the oil coming through the passage 15 strikes the upstream side of the ring 13, the latter is maintained tightly against the upstream facing surface of the gland. No oil is permitted to escape thereby, except through the gap which is formed on the downstream side of the ring. The gap on the upstream side has no effect because it is sealed off from the downstream side except for the other gap which is on the downstream side. Since the ring is of a smaller internal diameter, it will cling tightly to the circumferential surface of the main shaft 10. Since the oil has access to the circumferential surface of the ring 13, it maintains the ring in tight encircling relation to the shaft 10. As a consequence, the only path of escape of any material flow of oil is through the gap 26 which is on the downstream side of the ring.

As a result of the above, the amount of oil which is permitted to flow through the passage 15 is substantially reduced, and the excess oil provided thereby becomes available for use elsewhere within the automatic transmission.

The net effect of the restriction of the flow of oil is to maintain an effective oil bearing between the main shaft and the front end bearing. This precludes lock-up between the main shaft and the front bearing. The increased pressure in the oil passage between the main shaft and the front bearing causes that oil passage to become more effective in that it will withstand greater stress which may be imposed upon the main shaft, since a thinner film of oil under greater pressure is more effective than the same film under a lesser pressure.

Use of rings such as described hereinabove to restrict the flow of oil between the front bearing and the main shaft will enable the automatic transmission manufacturers to utilize smaller pumps and to more effectively utilize the supply of oil provided by the oil pump, since the excess of oil which was previously permitted to flow between the main shaft and front bearing can now be diverted to other areas of the automatic transmission at which it is needed.

It will, of course, be understood that various changes may be made in the form, details, arrangement and proportions of the parts without departing from the scope of the invention which comprises the matter shown and described herein and set forth in the appended claims.

I claim:

1. In an automatic transmission for motorized vehicles, (a) a rotatable main shaft rotatably carried by the transmission;

(b) a front bearing having an inner bearing surface surrounding said main shaft in closely spaced relation thereto and defining a narrow annular oil-flow passage therebetween and having a downstream end;

(c) a housing closely surrounding said front bearing in fixed relation thereto and having an inner surface facing said shaft in spaced relation thereto;

(d) said housing having an annular gland formed in the inner surface thereof adjacent to and axially beyond the downstream end of said bearing and surrounding said shaft in spaced but close proximity thereto and having a downstream wall surface extending radially relative to said shaft opposite to and spaced axially of said downstream end of said front bearing;

(e) a split thermoplastic ring positioned within said gland and surrounding said main shaft and partially restricting the flow of oil between said bearing and said shaft, said ring being made of plastic material having pressure velocity value of at least 20,000 at 100 feet/minute surface speed;

(f) said ring having an inner diameter only slightly less than the outer diameter of said main shaft so as to fit tightly around said main shaft and having overlapping circumferentially extending free end portions with circumferentially extending open gaps disposed between said end portions when said ring is so disposed around said main shaft;

(g) at least one of said gaps communicating between said oil-flow passage at the downstream end of said front bearing and the area between said main shaft and said housing at a point downstream of said front bearing and of said ring and extending circumferentially of said ring a distance within the range of about 0.006"–0.300", and having axial dimensions within the range of 0.006"–0.150";

(h) said gland being partially defined in said housing by a wall structure extending axially of said shaft between said downstream wall surface of said housing and said bearing and being radially aligned with, but spaced from, the outer circumference of said ring a distance of at least 0.0005".

2. The structure defined in claim 1, wherein the preferred range of the circumferential dimensions of said communicating gap is about 0.040"–0.150".

3. The structure defined in claim 1, wherein the preferred range of the axial dimensions of said communicating gap is about 0.020"–0.070".

4. The structure defined in claim 1, wherein the combined axial dimensions of said overlapping circumferentially extending free end portions slightly exceed the cross-sectional axial dimensions of the portions of said ring adjacent to said free end portions.

5. The structure defined in claim 1, wherein the combined axial dimensions of said overlapping circumferentially extending free end portions is at least 0.0578".

6. The structure defined in claim 1, wherein the circumferential dimensions of said communicating gap is about 0.106"–0.108" and the axial dimensions of said communicating gap are about 0.0263"–0.0271".

7. In an automatic transmission for motorized vehicles, (a) a rotatable main shaft rotatably carried by the transmission;

(b) a front bearing member having an inner bearing surface surrounding said main shaft in closely spaced relation thereto and defining a narrow annular oil-flow passage therebetween and having a downstream end;

(c) a housing member carrying said front bearing member in fixed relation thereto and having an inner surface facing said shaft in spaced relation thereto;

(d) one of said members having an annular gland formed in said inner surface thereof adjacent to the downstream end of said bearing and surrounding said shaft in spaced but close proximity thereto and having a downstream wall surface extending radially relative to said shaft;

(e) a split thermoplastic ring positioned within said gland against said downstream wall surface and surrounding said main shaft and partially restricting the flow of oil between said bearing and said shaft, said ring being made of plastic material having pressure velocity value of at least 20,000 at 100 feet/minute surface speed;

(f) said ring having an inner diameter only slightly less than the outer diameter of said main shaft so as to fit tightly around said main shaft and having overlapping circumferentially extending free end portions with at least one circumferentially extending open gap disposed therebetween when said ring is so disposed around said main shaft;

(g) said ring having a downstream radially extending wall surface abutting said downstream wall surface of said gland and sealing thereagainst and having an upstream radially extending wall surface axially spaced from said upstream wall surface of said gland;

(h) said gland being partially defined in said gland-carrying member by a wall structure which extends axially of said shaft upstream of said downstream radially extending wall surface and is radially aligned with but spaced from the outer circumference of said ring a distance of at least 0.0005"; and (i) said gap communicating between said radially aligned space and the space between said gland carrying member and said shaft at a point downstream of said ring, and extending circumferentially of said ring a distance within the range of 0.006"–0.300" and having axial dimensions within the range of 0.006'–0.150'.

8. The structure defined in claim 7, wherein the preferred range of the circumferential dimensions of said gap is about 0.040"–0.150".

9. The structure defined in claim 7, wherein the preferred range of the axial dimensions of said gap is about 0.020"–0.070".

10. The structure defined in claim 7, wherein the combined axial dimensions of said overlapping circumferentially extending free end portions slightly exceed the cross-sectional axial dimensions of the portions of said ring adjacent to said free end portions.

11. The structure defined in claim 7, wherein said overlapping circumferentially extending free end portions each have axial dimensions approximating 0.029" and the overall cross-section of said ring is slightly less than 0.058".

12. The structure defined in claim 7, wherein the circumferential dimensions of said communicating gap is about 0.090"–0.130" and the axial dimensions of said gap are about 0.0263" to 0.0271".

13. A method of controlling the rate of downstream flow of oil axially past the front bearing of the main shaft in the enclosing housing of an automatic transmission, to within a predetermined range consisting in, (a) forming an annular gland within the housing around the main shaft just beyond the downstream end of the bearing, the gland being larger in outer circumference than the inner surface of the bearing; and (b) inserting, within the gland, a split ring made of plastic material having a pressure velocity value of at least 20,000 at 100 feet/minute surface speed and having overlapping free end portions with circumferential gaps therebetween of 0.006 to 0.300 inches in circumferential length spaced axially downstream of the front bearing, the ring having a predetermined axial dimension which is less than the axial dimension of the gland and having a circumferential surface which has a radius of at least 0.0005" less than the circumference of the gland and having a free-form internal diameter which is slightly less than the diameter of the main shaft, (c) the gap disposed most remotely in an axial direction from the downstream end of the bearing having an axial dimension within the range of 0.006"–0.150" and a circumferential dimension within the range of 0.006"–0.300" and communicating in an oil-flow restricting relation with the downstream area between the housing and the main shaft.

14. The method defined in claim 13, wherein the ring which is inserted within the gland has circumferential gaps disposed at axially spaced opposite sides of the ring.

15. The method defined in claim 13, wherein the combined axial dimensions of the overlapping free end portions of the split ring which is inserted within the gland are at least as large as the axial dimensions of the portions of the ring adjacent to the circumferential gaps.

* * * * *